June 26, 1945.  J. C. SHAW  2,379,109
TEMPERATURE-CONTROLLED VALVE MECHANISM
Filed Nov. 15, 1943    2 Sheets-Sheet 1
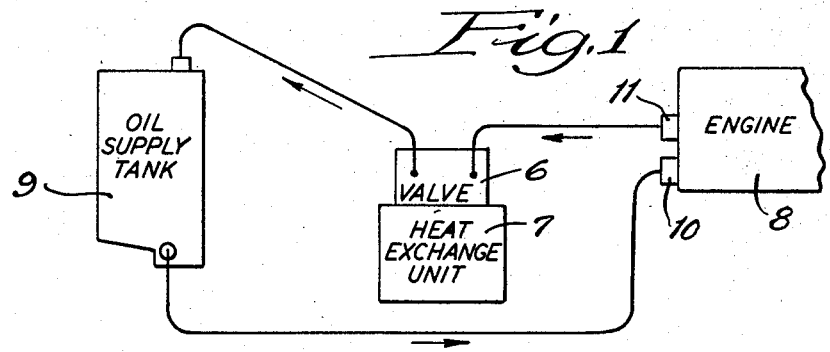
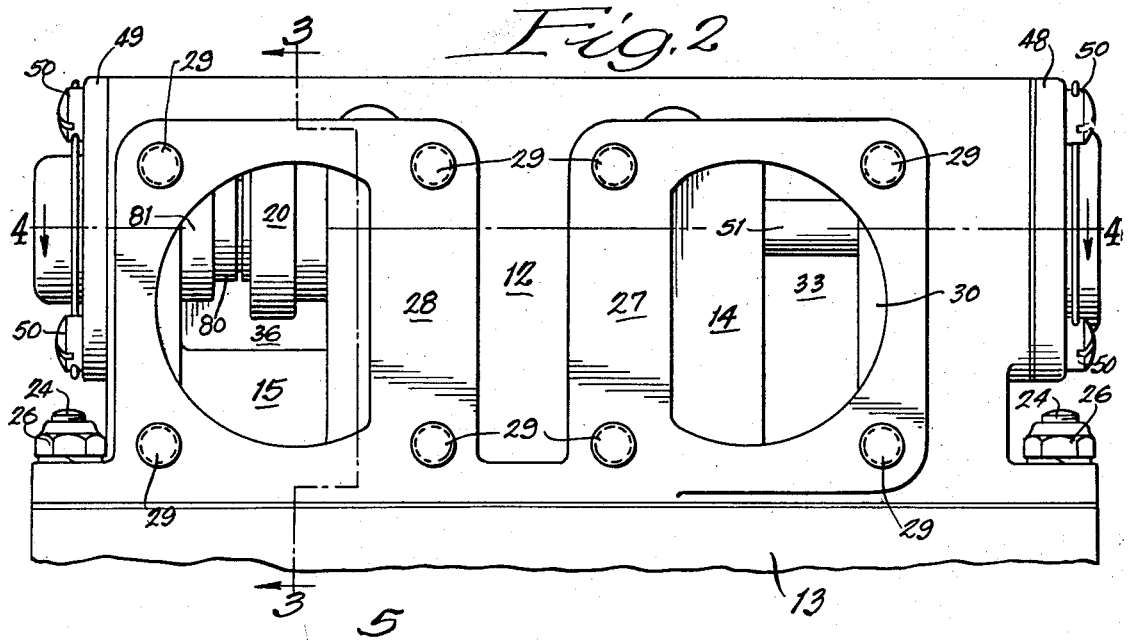
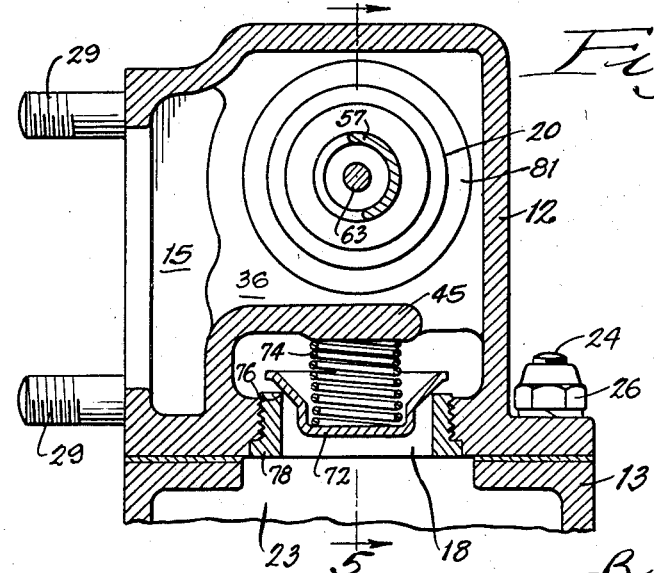
Inventor.
Joe C. Shaw,
By Sooms Pond & Anderson
Attorneys.

June 26, 1945.  J. C. SHAW  2,379,109
TEMPERATURE-CONTROLLED VALVE MECHANISM
Filed Nov. 15, 1943  2 Sheets-Sheet 2
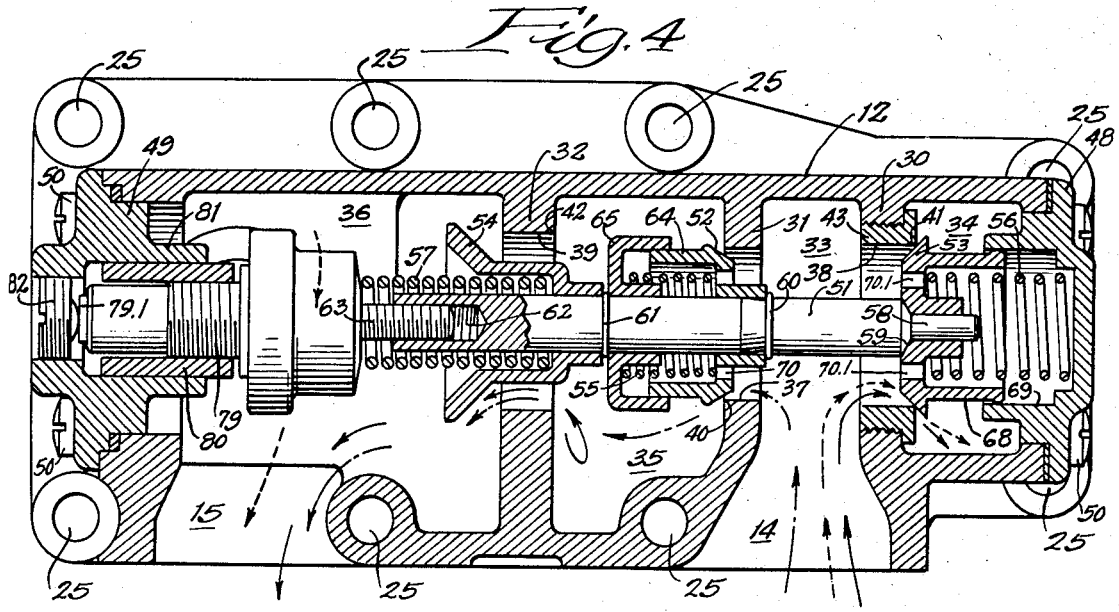
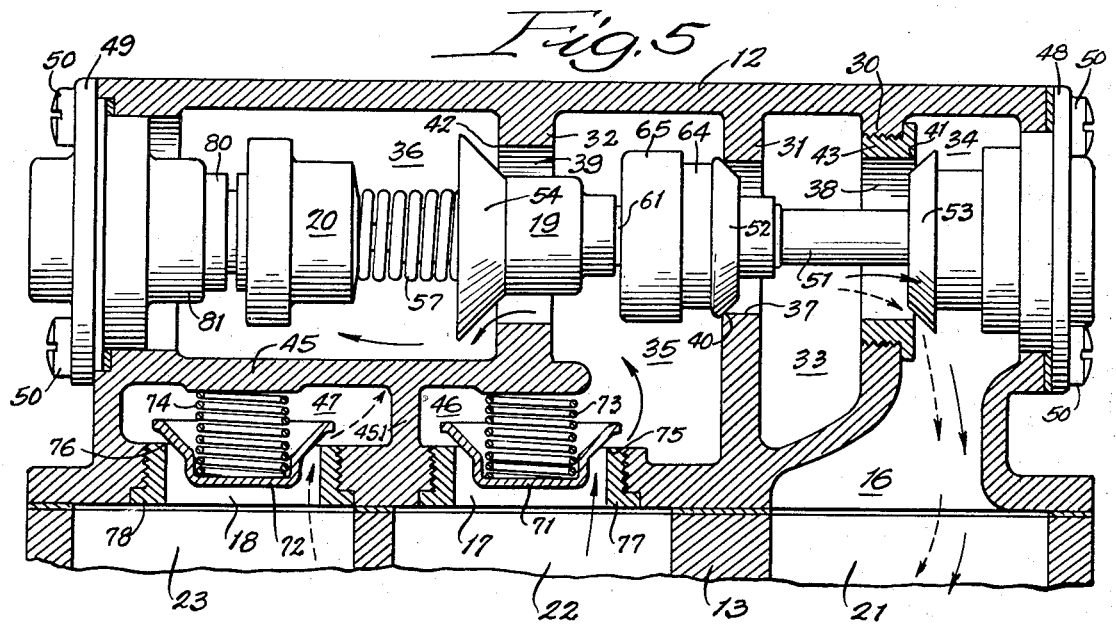
Inventor:
Joe C. Shaw,
By Soans Pond Henderson
Attorneys Patented June 26, 1945

2,379,109

UNITED STATES PATENT OFFICE 2,379,109

TEMPERATURE-CONTROLLED VALVE MECHANISM

Joe C. Shaw, Racine, Wis., assignor to Young Radiator Company, a corporation of Wisconsin Application November 15, 1943, Serial No. 510,336

11 Claims. (Cl. 236—34)

This invention relates to temperature-controlled valve mechanism for heat exchange units used in connection with fluid cooling systems. It is particularly designed for use with heat exchange units for the oil cooling systems of aircraft engines which employ an auxiliary or warm-up chamber in connection with the main cooling core. However, it can be applied to any kind of heat exchange unit wherein it is desired to automatically regulate the flow of oil through two related channels.

In modern aircraft, it is essential to superior operation of the engine to keep the lubricating oil as nearly as possible at a uniform temperature. Such uniform temperature must be maintained regardless of the extremely varying temperatures around and above the earth's surface where aircraft are used. Accomplishing that uniform temperature demands a regulated cooling system wherein the degree of heat exchange exposure of the cooling medium and the coolant may be varied automatically so as to compensate for the over-all conditions of weather and engine operation.

The pressure required to circulate the oil through the cooling system depends upon the viscosity of the oil. The viscosity of the oil is dependent in turn upon the comparative conditions of the weather temperature and the heat of the oil created by the operation of the engine. Whenever these comparative conditions are such that the oil becomes congealed, the pressure created by the pump must be diverted from the heat exchange unit until the viscosity of the oil becomes sufficiently reduced to permit the ready flow of the oil through the unit.

The main objects of this invention, therefore, are to provide a valve mechanism for heat exchange units used with aircraft oil cooling systems which will automatically channel the flow of the oil so that the degree of heat exchange contact of the oil and cooling medium will be so regulated as to keep the temperature of the oil substantially uniform regardless of the weather conditions; to provide an improved valve mechanism of this kind which will also operate to channel the surge of oil around the heat exchange unit when the viscosity of the oil would be such as to create undue pressure on said unit; to provide improved valve mechanism for heat exchange units of this kind capable of accomplishing this dual function through the influence of a single thermostat unit exposed to the temperature of the oil itself; and to provide an improved construction of a valve mechanism of this kind which is extremely simple and economical to manufacture, which is positive in its operation, and which can be used with various types of heat exchange units.

In the particular embodiment of this invention shown in the drawings:

Fig. 1 is a diagrammatic view indicating the application of this improved type of valve mechanism to the oil cooling system for an aircraft engine;

Fig. 2 is an enlarged side elevation of the valve mechanism; the view includes a portion of the base by means of which the valve mechanism is secured to the heat exchange unit;

Fig. 3 is a transverse sectional view taken on the line 3—3 of Fig. 2;

Fig. 4 is a horizontal cross sectional view of the valve mechanism taken on the line 4—4 of Fig. 2; and Fig. 5 is a vertical sectional view taken on the line 5—5 of Fig. 3, the valve mechanism being shown in elevation.

As diagrammatically illustrated in Fig. 1, this valve mechanism 6 is mounted on a heat exchange unit 7 suitably connected in an oil cooling system for an aircraft engine 8, the oil for which is supplied from a tank 9. In general practice, a pair of pumps 10 and 11 are arranged to pump the oil from the supply tank 9 to the engine 8 and from the engine to the valve mechanism enroute back to the oil supply tank 9. The flow of the oil is indicated by the arrows in the figure. The heat exchange unit 7, for use with which this valve mechanism is particularly designed, is of a somewhat conventional design. It generally comprises a cylindrical shell enclosing a bundle of cylindrical tubes, the ends of which have been expanded into hexagons and bonded together so as to provide a core around the tubes wherein the oil is circulated and cooled by means of air forced through these tubes. Such a unit has either a transverse or an annular auxiliary warm-up chamber through which the oil may be channeled by the valve mechanism 6, depending upon the comparative temperature of the weather and of the oil.

In this particular embodiment, the valve mechanism 6 comprises a housing 12 mounted on a base 13 and having a number of partitions therein which divide the interior into chambers having communication with one another and with the main inlet 14, the main outlet 15, the associate outlet 16, and the associate inlets 17 and 18. The flow of fluid through these various chambers, inlets, and outlets is controlled by a valve mechanism 19 under the influence of a thermostat 20. Gasketed caps 48 and 49, are secured in place by cap screws 50 and provide support for the valve mechanism 19 and the thermostat 20, as will be more clearly hereinafter pointed out.

The base member 13 is suitably fixed to the shell of the heat exchange unit 7 and has channels 21, 22, and 23 which provide communication between sections of the unit 7 and the chambers in the housing 12 through the associate outlets 16 and the associate inlets 17 and 18 respectively. Stud bolts 24 are fixed on the base for reception in the openings 25 whereby the housing 12 is secured in place.

As will be more particularly noted from Fig. 2, the inlet 14 and outlet 15 are on the side of the housing 12 at substantially opposite ends. The housing adjacent to these openings is formed with flat surfaces 27 and 28 and equipped with suitable stud bolts 29 which permit the gasketed connection of oil tubes leading to and from the housing. The associate outlet 16 and the associate inlets 17 and 18 are located in the underside of the housing 12 in staggered relationship circumferentially and axially with respect to the main inlet 14 and outlet 15. As will be noted in Fig. 5 these associate openings 16, 17, and 18 register with the respective base-member channels 21, 22, and 23.

Within the housing 12 are three transverse partitions 20, 31, and 32 which divide the interior into four chambers 33, 34, 35, and 36 (see Figs. 4 and 5). The chamber 33 opens directly into the main inlet 14, whereas the chamber 36 opens directly into the main outlet 15, and has direct communication with the associate inlet 18. The chamber 34 opens directly into the associate outlet 16 (see Fig. 5), whereas the chamber 35 communicates directly with the associate inlet 17. An axially disposed partition 45, at the end of the housing 12 adjacent to the main outlet 15, with an offset partition 45.1 forms the associate chambers 46 and 47 which communicate respectively with the chambers 35 and 36 and the associate inlets 17 and 18.

The three transverse partitions 30, 31, and 32 have axially aligned openings 37, 38, and 39 which provide communication between these several chambers so that, under the influence of the valve mechanism 19, the flow of oil into, through, and out of the housing is appropriately controlled. These openings 37, 38, and 39 are provided with valve seats 40, 41, and 42 respectively which co-act with the appropriate valves of the valve mechanism 19 as will more clearly hereinafter appear.

The opening 38 and the valve seat 41 are formed in and on a bushing 43, whereas the openings 37 and 39 and the valve seats 40 and 42 are formed in and on the partitions 31 and 32 respectively. However, bushings could be employed. As will be noted from Figs. 4 and 5, the bushing 43 is screwed into the partitions 30 although it could be a press fit.

The main valve mechanism 19 comprises a stem 51 extending axially through the openings 37, 38 and 39, and supporting the valve members 52, 53, and 54 which, under the urge of spring mechanisms 55, 56, and 57, are operatively related to their respective valve seats 40, 41, and 42.

The valve stem 51 has a reduced extension 58 on its right hand end, as viewed from Fig. 4, which provides a shoulder 59 against which the spring 56 urges the valve member 53. Inwardly of this shoulder 59 are other shoulders 60 and 61 against which the valve members 53 and 54 are urged by the springs 55 and 57 respectively. The opposite end of the valve stem 51 has a threaded aperture 62 into which adjustably connects a pin 63 on the thermostat 20.

The valve member 52 is formed on the end of a sleeve 64 which slidably fits within a collar 65 supported on the valve stem 51, and provides a piston-cylinder effect for these two valves. The spring 55 holds these parts against the shoulders 60 and 61 respectively but permits a relative movement of the valve member 52 and collar 65 so that the seating and unseating of the valve 54 is effected after and before the seating and unseating of the valve 52.

The valve member 53 has a sleeve 68 which is slidably mounted in the collar 69 formed on the end cap 48 so as to provide a piston-cylinder effect. The spring 56 interposed between the valve member 53 and cap 48 normally positions the valve mechanism 19 as indicated in Fig. 4.

The valve member 52 is provided with apertures 70 which permit the oil under pressure in the housing 12 to flow back of the valve and thus equalize the oil pressure on both sides of the valve. However, the diameter of the opening 37 is slightly greater than the inner diameter of the cylinder 65 in which the valve stem 64 is slidably supported. This establishes a condition of slight unbalance with the valve 52 due to a differential in the force of the oil pressure acting on opposite sides of the valve so that when the valve 52 is seated under the pressure of the thermostat 20 the valve 52 will retract against the action of the spring 55 to subsequent increasing oil pressure in the compartment 33.

Likewise, the valve member 53 is equipped with apertures 70.1 which permit the oil under pressure in the housing 12 to flow back of the valve and thus create the same pressure on both sides of the valve. However, the diameter of the opening 38 is the same as the diameter of the cylinder 69 so that the effective pressure on both sides of the valve 53 is exactly equal. This insures the movement of the valve 53 being confined to the pressure differential between the spring 56 and the action of the thermostat 20 under the changing temperature of the oil flowing through the housing 12.

Check valves 71 and 72, actuated by springs 73 and 74 respectively coact with valve seats 75 and 76 formed on the bushings 77 and 78 for controlling the flow of oil through the associate inlets 17 and 18, as will be more clearly hereinafter pointed out.

The thermostat 20 may be of any suitable form, either the conventional bellows type in which a volatile chemical is the motive agent or it may be a type wherein a wax substance with a high coefficient of expansion is used as the motive agent. The drawings indicate the use of the latter type. Such a thermostat is mounted in the chamber 36 inasmuch as there is always a flow of oil through that chamber and accordingly will always be immediately affected by the temperature changes in the oil in the system.

The thermostat housing is provided with the threaded stem 63 which is adjustably connected to the valve stem 51. On the opposite side the thermostat housing has an extension 79, a part of which is threaded into a sleeve 80 slidably mounted in a collar 81 formed on the end cap 50. The extension 79 slidably supports a plunger 79.1 the relative movement of which is influenced by the movement of the expansion element in the thermostat. This plunger 79.1 abuts a threaded plug 82, which may be turned so as to adjust the pressure of the thermostat on the spring 57 and thereby vary the temperature for the opening and closing of the valves.

The operation of the herein-shown valve mechanism, in connection with a heat exchange unit in a cooling system for the lubricating oil for an aircraft engine, is as follows:

This valve mechanism is designed for controlling the flow of lubricating oil at three different temperature stages:

*First stage:* A flow by-passing the heat exchange unit when the oil temperature is below 60° to 70° F.

*Second stage:* A flow through a warm-up chamber when the oil temperature is between 120° F. to 150° F.

*Third stage:* A flow through the core of the heat exchange unit when the oil temperature is 165° F. or over.

In the drawings Fig. 4 shows the valve mechanism in position for effecting the first stage of oil flow, whereas Fig. 5 shows the valve mechanism in position for effecting the second stage of oil flow.

The first stage flow occurs when the member 53, under the action of the spring 56, closes the opening 38 between the chambers 33 and 34. At that time, valve members 52 and 54 are both retracted, thus permitting communication through the openings 37 and 39 between the chambers 33, 35, and 36. This would be the position of these parts always when the temperature of the oil is below 60° to 70°. If under these circumstances, the oil cooling system is put into operation through the starting of engine 8, the flow of oil, caused by the pumps 10 and 11, will be through the housing 12 from the inlet port 14 to the outlet port 15 as indicated by the dot and dash arrows in Fig. 4. The oil by-passes the heat exchange unit 7 and circulates only through the pipe connections between the engine 7 and the oil supply tank 9.

The oil in the chamber 36 is precluded from passage through the associate inlets 17 and 18 by means of the spring-actuated check valves 71 and 72. These valves will permit only a flow of oil into the chamber 36 when the position of the valves 52, 53, and 54 direct the oil flow through one or the other channels through the heat exchange unit 7.

This flow of the oil, by-passing the heat exchange unit 7, is especially imperative when sub-zero temperature causes the oil to congeal in the heat exchange unit 7 or become so highly viscous that it is extremely resistant to flow through the narrow passages of the core of the unit. To permit the pressure of the pumps 10 and 11 to be applied directly to the unit in an attempt to move the congealed or highly viscous oil very likely would result in injury to the unit.

This first stage flow, completely by-passing of the heat exchange unit 7, continues until the temperature of the oil begins to approach 60° to 70° F. At that time the thermostat 20, responding to this first critical temperature, starts a shift of the valve stem 51 to the right. This movement of the stem causes a simultaneous movement of the valve members 52 and 53, the former tending to close the opening 37, the latter tending to open communication between the chambers 33 and 34. Thereupon the second stage of oil flow will be initiated which will require some considerable increase in the temperature of the oil before the second stage is consummated. Entering the opening 38 this warming oil begins to influence the colder and more viscous oil in the chamber 34 and in the outlet 16 which will thereupon tend to warm up and make less viscous the oil in that part of the cooler with which the ports 21 and 22 are connected. As the temperature continues to rise, the thermostat 20 continues to shift the valve 53 to admit an increasing amount of the rising-temperature oil to the chamber 34 and its associated outlet 16. As soon as the greater quantity of this constantly warmer oil conditions the colder oil in that portion of the heat exchange unit, interposed between the ports 21 and 22, and effects the appropriate pressure against the check valve 71 to cause it to open, the second stage of oil flow will have been fully consummated. This will occur when the temperature of the oil has been stepped up to between 120° and 150° F. This second stage flow will continue so long as the temperature of the oil is maintained between these ranges. The path of this second stage flow is indicated by the full line arrows in Figs. 4 and 5.

Inasmuch as the associate outlet 16 communicates with the port 21 that leads to the warm-up chamber of the heat exchange unit 7, the oil flows through the warm-up chamber and out through the port 22 through the associate inlet 17 into the chamber 35, from whence it flows into the chamber 36 to the main housing outlet 15, as indicated by the full-line arrows in the figures.

This splitting of the oil flow during the initial shifting of the valves tends to accelerate the rise in the temperature of the oil. The thermostat 20 continues the valve movement until the valve 52 is seated and the opening 37 completely closed, as shown in Fig. 5 of the drawings. The second stage of oil flow is then fully consummated. Moreover, this second stage flow continues so long as the oil temperature is maintained well within the range of 120° to 150° F.

Weather conditions and engine operation permitting, the flow of the oil through the warm-up chamber of the heat exchange unit 7 will tend to step up the temperature of the oil in the core of the unit. As soon as this has been effected to an extent that the oil passing the thermostat 20 approaches 165° F., the thermostat will be further actuated so as to push the valve stem 51 increasingly to the right until the valve 54 finally closes the opening 39 and shuts off communication between the chambers 35 and 36. Oil then may no longer pass out of the chamber 35 whereupon a back pressure is built up in the warm-up chamber of the heat exchange unit 7. However, communication is open between the associate chamber 47 and the chamber 36. Hence the third stage of oil flow is initiated. The oil will continue its movement through the main housing inlet 14, the chamber 33, the chamber 34, and to the associate outlet 16 as indicated by the dotted arrows in the figures. The oil not being able to pass through the warm-up chamber begins to flow through the core of the heat exchange unit and is discharged therefrom through the port 23, the associate inlet 18, associate chamber 47, chamber 36, and through the main outlet 15, as indicated by the dotted arrows in the figures. Here, also, this third stage flow will continue so long as the temperature of the oil passing through the chamber 36 is such as to force the thermostat 20 to seat the valve 54.

If at any time, due to the over-all weather conditions and engine operation, the temperature of the oil passing through the chamber 36 recedes from 165° F., the thermostat 20 will respond to unseat the valve member 54 and open communication between the chambers 35 and 36. This would again permit a complete return to the second stage oil flow or merely split the flow between the second and third stage paths depending upon the extent to which the oil temperature varies from the critical 165° F.

Moreover, if the conditions of weather and engine operation combine to cause the oil temperature to recede below 120° F., the thermostat 20 will further respond to the cooler temperatures and alter communication between the chamber 33 and the opposite chambers 34 and 35 so as to regulate the degree of flow directly through the valve casing from the inlet 14 to the outlet 15 or from the inlet 14 to the associate outlet 16 and consequently through the warm-up chamber of the heat exchange unit 7.

Thus, it will be noted that this valve mechanism makes provision for the dual purpose of maintaining a more or less uniform temperature of the oil during engine operation, and the complete by-passing of the heat exchange unit whenever temperatures of the oil recede to a degree that would make unsafe the application of pump pressure to the oil in the core of the heat exchange unit 7.

Since certain changes may be made in the foregoing constructions and methods of the invention without departing from the scope thereof, it is intended that all matter contained in the above description and shown in the accompanying drawings shall be interpreted as illustrative and not in a limiting sense, and that the appended claims shall be given the broadest construction consistent with the state of the prior art.

I claim:

1. A temperature-control valve mechanism comprising, a housing interiorly partitioned to provide a series of end and intermediate chambers and having a main fluid outlet communicating with one of said chambers and a main fluid inlet communicating with another of said chambers one chamber removed from said first-mentioned or outlet chamber, said housing partitions having openings arranged in axial alignment lengthwise of said housing so as to provide direct communication between said inlet chamber and said outlet chamber by means of said partition openings, said housing also having auxiliary fluid inlets communicating with the chamber intermediate said inlet and outlet chambers and with said outlet chamber respectively and an auxiliary outlet communicating with the chamber at the side of said inlet chamber opposite said intermediate chamber, thermostatic means arranged in said housing exposed to the flow of fluid through said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of the partitions bounding said inlet chamber, said valves being normally positioned relative to each other on said stem whereby when one valve is seated the other is retracted, and a third valve mounted on said stem adapted for seating on the partition separating said outlet chamber and the aforesaid intermediate chamber.

2. A temperature-control valve mechanism comprising, a housing interiorly partitioned to provide a series of end and intermediate chambers and having a main fluid outlet communicating with one of said chambers and a main fluid inlet communicating with another of said chambers one chamber removed from said first-mentioned or outlet chamber, said housing partitions having openings arranged in axial alignment lengthwise of said housing so as to provide direct communication between said inlet chamber and said outlet chamber by means of said partition openings, said housing also having auxiliary fluid inlets communicating with the chamber intermediate said inlet and outlet chambers and with said outlet chamber respectively and an auxiliary outlet communicating with the chamber at the side of said inlet chamber opposite said intermediate chamber, thermostatic means arranged in said housing exposed to the flow of fluid through said outlet chamber, a valve stem extending through all of said chambers and partition openings and connected to said thermostatic means for axial movement thereby, a pair of valves slidably mounted on said stem and located in chambers on opposite side of said inlet chamber and adapted to be seated against opposite sides of the partitions bounding said inlet chamber, said valves being normally positioned relative to each other on said stem whereby when one valve is seated the other is retracted, a third valve slidably mounted on said stem adapted for seating on the partition separating said outlet chamber and the aforesaid intermediate chamber, shoulders on said stem limiting the relative movement of said valves thereon in the direction of their respective partition valve seats, and resilient means urging each of said valves towards its respective stem shoulders.

3. A temperature-control valve mechanism comprising, a housing interiorly partitioned to provide a series of end and intermediate chambers and having a main fluid outlet communicating with one of said chambers and a main fluid inlet communicating with another of said chambers one chamber removed from said first-mentioned or outlet chamber, said housing partitions having openings arranged in axial alignment lengthwise of said housing so as to provide direct communication between said inlet chamber and said outlet chamber by means of said partition openings, said housing also having auxiliary fluid inlets communicating with the chamber intermediate said inlet and outlet chambers and with said outlet chamber respectively and an auxiliary outlet communicating with the chamber at the side of said inlet chamber opposite said intermediate chamber, thermostatic means located in said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of the partitions bounding said inlet chamber, said valves being normally positioned relative to each other on said stem whereby when one valve is seated the other is retracted, a third valve mounted on said stem adapted for seating on the partition separating said outlet chamber and the aforesaid intermediate chamber, and resilient means interposed between the end of said valve stem opposite said thermostatic means and the adjacent housing so as to normally resist the axial shifting of said valve stem.

4. A temperature-control valve mechanism comprising, a housing interiorly partitioned to provide a series of end and intermediate chambers and having a main fluid outlet communicating with one of said chambers and a main fluid inlet communicating with another of said chambers one chamber removed from said first-mentioned or outlet chamber, said housing paritions having openings arranged in axial alignment lengthwise of said housing so as to provide direct communication between said inlet chamber and said outlet chamber by means of said partition openings, said housing also having auxiliary fluid inlets communicating with the chamber intermediate said inlet and outlet chambers and with said outlet chamber respectively and an auxiliary outlet communicating with the chamber at the side of said inlet chamber opposite said intermediate chamber, thermostatic means located in said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of the partitions bounding said inlet chamber, said valves being normally positioned relative to each other on said stem whereby when one valve is seated the other is retracted, a third valve mounted on said stem adapted for seating on the partition separating said outlet chamber and the aforesaid intermediate chamber, and resilient means interposed between the end of said valve stem opposite said thermostatic means and the adjacent housing so as to normally resist the axial shifting of said valve stem, the connection of said thermostatic means and valve stem permitting relative adjustment of said thermostatic means and said valve stem for the purpose of modifying the action of said valves in regulating the oil flow through said openings.

5. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means arranged in said housing exposed to the flow of fluid through said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of partitions bounding said inlet chamber, said valves being normally positioned relative to each other on said stem whereby when one valve is seated the other is retracted, piston-cylinder means associated with each of said valves, resilient means interposed in each of said piston-cylinder means and normally urging said valves toward their seating positions, and a third valve mounted on said stem and adapted for seating on the partition separating said outlet chamber and said adjacent intermediate chamber for controlling the flow of fluid from said intermediate chamber to said outlet chamber.

6. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means arranged in said housing exposed to the flow of fluid through said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of partitions bounding said inlet chamber, said valves being normally positioned relative to each other on said stem whereby when one valve is seated the other is retracted, piston-cylinder means associated with each of said valves, resilient means interposed in each of said piston-cylinder means and normally urging said valves toward their seating positions, a third valve mounted on said stem and adapted for seating on the partition separating said outlet chamber and said adjacent intermediate chamber for controlling the flow of fluid from said intermediate chamber to said outlet chamber, one of said piston-cylinder means having a diameter of the cylinder less than the diameter of its valve opening and the other said piston-means having a diameter equal to the diameter of its corresponding valve opening, and means providing communication between said inlet chamber and each of said piston-cylinder means rearwardly of said pistons.

7. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means arranged in said housing exposed to the flow of fluid through said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of partitions bounding said inlet chamber, said valves being normally positioned relative to each other on said stem whereby when one valve is seated the other is retracted, piston-cylinder means associated with each of said valves, resilient means interposed in each of said piston-cylinder means and normally urging said valves toward their seating positions, a third valve mounted on said stem and adapted for seating on the partition separating said outlet chamber and said adjacent intermediate chamber for controlling the flow of fluid from said intermediate chamber to said outlet chamber, one of said piston-cylinder means having a diameter of the cylinder less than the diameter of its valve opening and the other said piston-means having a diameter equal to the diameter of its corresponding valve opening, and apertures in said valves providing communication between said inlet chamber and each of said piston-cylinder means rearwardly of said pistons.

8. A temperature-control valve mechanism comprising, a housing interiorly partitioned to provide a series of end and intermediate chambers and having a main fluid outlet communicating with one of said chambers and a main fluid inlet communicating with another of said chambers one chamber removed from said first-mentioned or outlet chamber, said housing partitions having openings arranged in axial alignment lengthwise of said housing so as to provide direct communication between said inlet chamber and said outlet chamber by means of said partition openings, said housing also having auxiliary fluid inlets communicating with the chamber intermediate said inlet and outlet chambers and with said outlet chamber respectively and an auxiliary outlet communicating with the chamber at the side of said inlet chamber opposite said intermediate chamber, thermostatic means arranged in said housing exposed to the flow of fluid through said outlet chamber, a valve stem extending through all of said chambers and partition openings and connected to said thermostatic means for axial movement thereby, a pair of valves mounted on said stem and located in chambers on opposite sides of said inlet chamber and adapted to be seated against opposite sides of the partitions bounding said inlet chamber, said valves being normally positioned relative to each other on said stem whereby when one valve is seated the other is retracted, a third valve mounted on said stem adapted for seating on the partition separating said outlet chamber and the aforesaid intermediate chamber, and check valves controlling said auxiliary inlets and adapted to admit a fluid flow to said intermediate and outlet chambers respectively when said second and third valves are respectively seated.

9. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means located in said outlet chamber, a valve stem extending through all of said chambers and partition openings and connected to said thermostatic means for axial movement thereby, a valve slidably mounted on the end of said stem and located in the end chamber opposite said outlet chamber so as to control the adjacent partition opening, second and third valves slidably mounted on said valve stem in opposed relationship to said first-mentioned valve, said second valve being located in the chamber intermediate said inlet and outlet chambers and said third valve being located in said outlet chamber so as to control the respective partition openings, shoulders on said valve stem limiting the relative movement of said valves thereon in the direction of their respective partitioned openings, said shoulders being relatively positioned so that when said valves are in contact with said shoulders said second and third valves are seated and unseated subsequently to each other and in synchronization with the unseating and seating of said first-mentioned valve, a piston formed on said first-mentioned valve slidable in a cylinder formed on the adjacent end of said housing, resilient means associated with said piston and cylinder so as to urge said valve in contact with its respective valve-stem shoulder, a piston formed on said second valve slidably mounted in a cylinder supported on said valve stem, resilient means associated with said second piston and cylinder so as to urge said second valve in contact with its respective valve-stem shoulder, and resilient means interposed between said third valve and said thermostatic means so as to urge said third valve in contact with its respective valve-stem shoulder.

10. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means located in said outlet chamber, a valve stem extending through all of said chambers and partition openings and connected to said thermostatic means for axial movement thereby, a valve slidably mounted on the end of said stem and located in the end chamber opposite said outlet chamber so as to control the adjacent partition opening, second and third valves slidably mounted on said valve stem in opposed relationship to said first-mentioned valve, said second valve being located in the chamber intermediate said inlet and outlet chambers and said third valve being located in said outlet chamber so as to control the respective partition openings, shoulders on said valve stem limiting the relative movement of said valves thereon in the direction of their respective partitioned openings, said shoulders being relatively positioned so that when said valves are in contact with said shoulders said second and third valves are seated and unseated subsequently to each other and in synchronization with the unseating and seating of said first-mentioned valve, a piston formed on said first-mentioned valve slidable in a cylinder formed on the adjacent end of said housing, resilient means associated with said piston and cylinder so as to urge said valve in contact with it respective valve-stem shoulder, a piston formed on said second valve slidably mounted in a cylinder supported on said valve stem, resilient means associated with said second piston and cylinder so as to urge said second valve in contact with its respective valve-stem shoulder, and resilient means interposed between said third valve and said thermostatic means so as to urge said third valve in contact with its respective valve-stem shoulder, the piston and cylinder for said first-mentioned valve having the diameter of the cylinder equal to the diameter of the adjacent partition opening and the piston-cylinder means of said second valve having the diameter of the cylinder less than the diameter of the adjacent partition opening, said valves having apertures formed therein to provide communication between said inlet chamber and the respective piston and cylinder means rearwardly of said pistons.

11. A temperature-control valve mechanism comprising, a housing interiorly partitioned to provide two end chambers and a pair of intermediate chambers and having a main fluid outlet communicating with one of said end chambers and a main fluid inlet communicating with one of said intermediate chambers one chamber removed from said first-mentioned or outlet chamber, said housing partitions having openings arranged in axial alignment lengthwise of said housing so as to provide direct communication between said inlet chamber and said outlet chamber by means of said partition openings, said housing having auxiliary fluid inlets communicating respectively with said outlet chamber and the chamber intermediate said inlet and outlet chambers and an auxiliary outlet communicating with the end chamber opposite said outlet chamber, thermostatic means located in said outlet chamber, a valve stem extending through all of said chambers and partition openings and connected to said thermostatic means for axial movement thereby, a valve slidably mounted on the end of said stem and located in the end chamber opposite said outlet chamber so as to control the adjacent partition opening, second and third valves slidably mounted on said valve stem in opposed relationship to said first-mentioned valve, said second valve being located in the chamber intermediate said inlet and outlet chambers and said third valve being located in said outlet chamber so as to control the respective partition openings, shoulders on said valve stem limiting the relative movement of said valves thereon in the direction of their respective partitioned openings, said shoulders being relatively positioned so that when said valves are in contact with said shoulders said second and third valves are seated and unseated subsequently to each other and in synchronization with the unseating and seating of said first-mentioned valve, a piston formed on said first-mentioned valve slidable in a cylinder formed on the adjacent end of said housing, resilient means associated with said piston and cylinder so as to urge said valve in contact with its respective valve-stem shoulder, a piston formed on said second valve slidably mounted in a cylinder supported on said valve stem, resilient means associated with said second piston and cylinder so as to urge said second valve in contact with its respective valve-stem shoulder, resilient means interposed between said third valve in contact with its respective valve-stem shoulder, the piston and cylinder for said first-mentioned valve having the diameter of the cylinder equal to the diameter of the adjacent partition opening and the piston-cylinder means of said second valve having the diameter of the cylinder less than the diameter of the adjacent partition opening, said valves having apertures formed therein to provide communication between said inlet chamber and the respective piston and cylinder means rearwardly of said pistons, and check valves controlling said auxiliary inlets and adapted to admit a fluid flow to the chamber intermediate said inlet and outlet chambers and to said outlet chamber respectively when said second and third valves are seated.

JOE C. SHAW.